United States Patent [19]

LaCreta

[11] 4,090,485
[45] May 23, 1978

[54] FUEL SYSTEMS FOR INTERNAL COMBUSTION ENGINES

[75] Inventor: Mario V. LaCreta, Kent, Ohio

[73] Assignee: Antonio LaCreta, Scottsdale, Ariz.; a part interest

[21] Appl. No.: 782,177

[22] Filed: Mar. 28, 1977

[51] Int. Cl.² ............................................. F02M 17/18
[52] U.S. Cl. ....................................... 123/133; 48/107; 48/180 C; 123/DIG. 12; 261/16; 261/98
[58] Field of Search ....... 48/107, 93, 199 R, 199 FM, 48/219, 211, 212, 180 C, 180 F; 261/16, 96, 98; 123/121, 133, 134, 135, DIG. 12, 179 G

[56] References Cited

U.S. PATENT DOCUMENTS

| | | | |
|---|---|---|---|
| 1,112,188 | 9/1914 | Atwood | 123/DIG. 12 |
| 1,947,129 | 2/1934 | Hyma | 261/16 |
| 2,884,917 | 5/1959 | Quinby | 123/133 |
| 3,174,472 | 3/1965 | Balogh | 261/16 |
| 3,913,545 | 10/1975 | Hasse et al. | 123/121 |
| 3,970,054 | 7/1976 | Henault et al. | 123/DIG. 12 |
| 4,011,847 | 3/1977 | Fortino | 123/121 |
| 4,033,133 | 7/1977 | Houseman et al. | 48/107 |
| 4,040,403 | 8/1977 | Rose et al. | 123/133 |

Primary Examiner—S. Leon Bashore
Assistant Examiner—George C. Yeung
Attorney, Agent, or Firm—Warren F. B. Lindsley

[57] ABSTRACT

A fuel vaporization system for hydrocarbon users, such as internal combustion engines, gas turbines and the like wherein the prior art gas generating and carburetor functions are accomplished in a novel chamber or fuel generator with additional benefits afforded through the use of controlled amounts of hydrogen.

10 Claims, 5 Drawing Figures

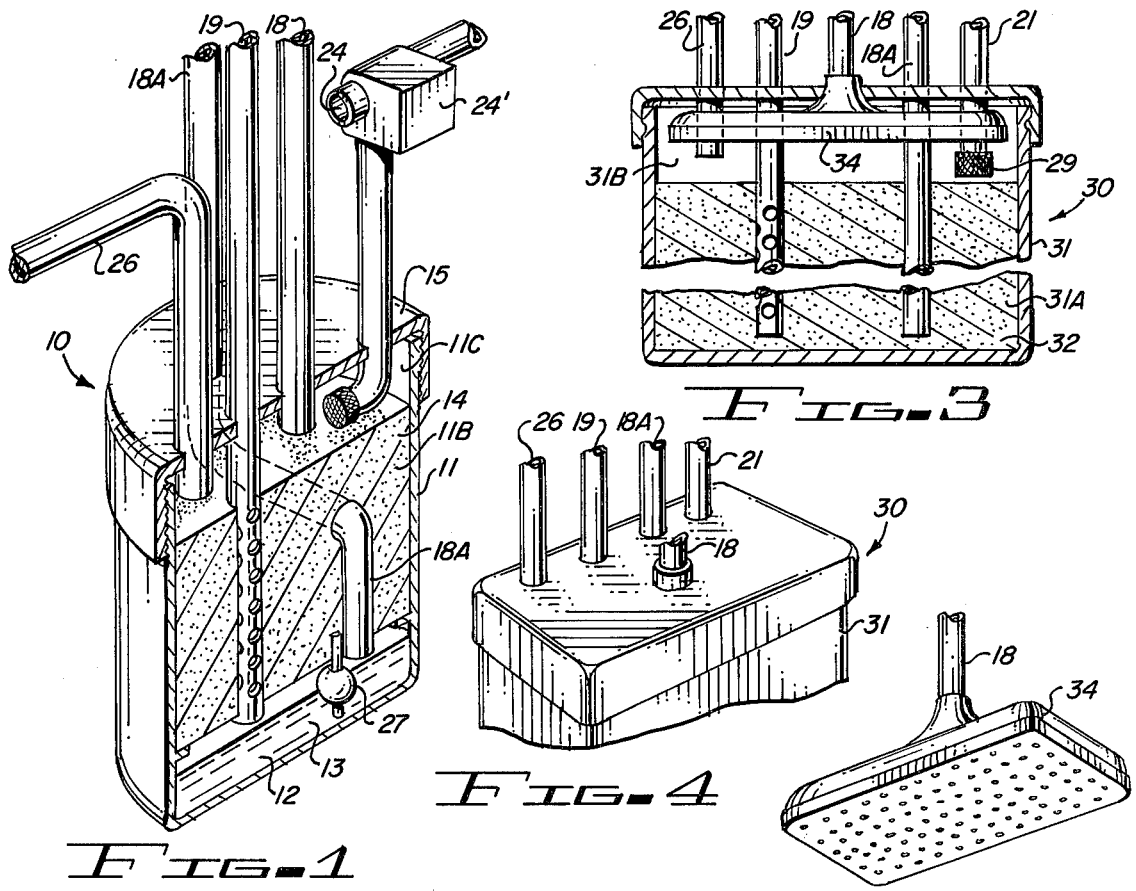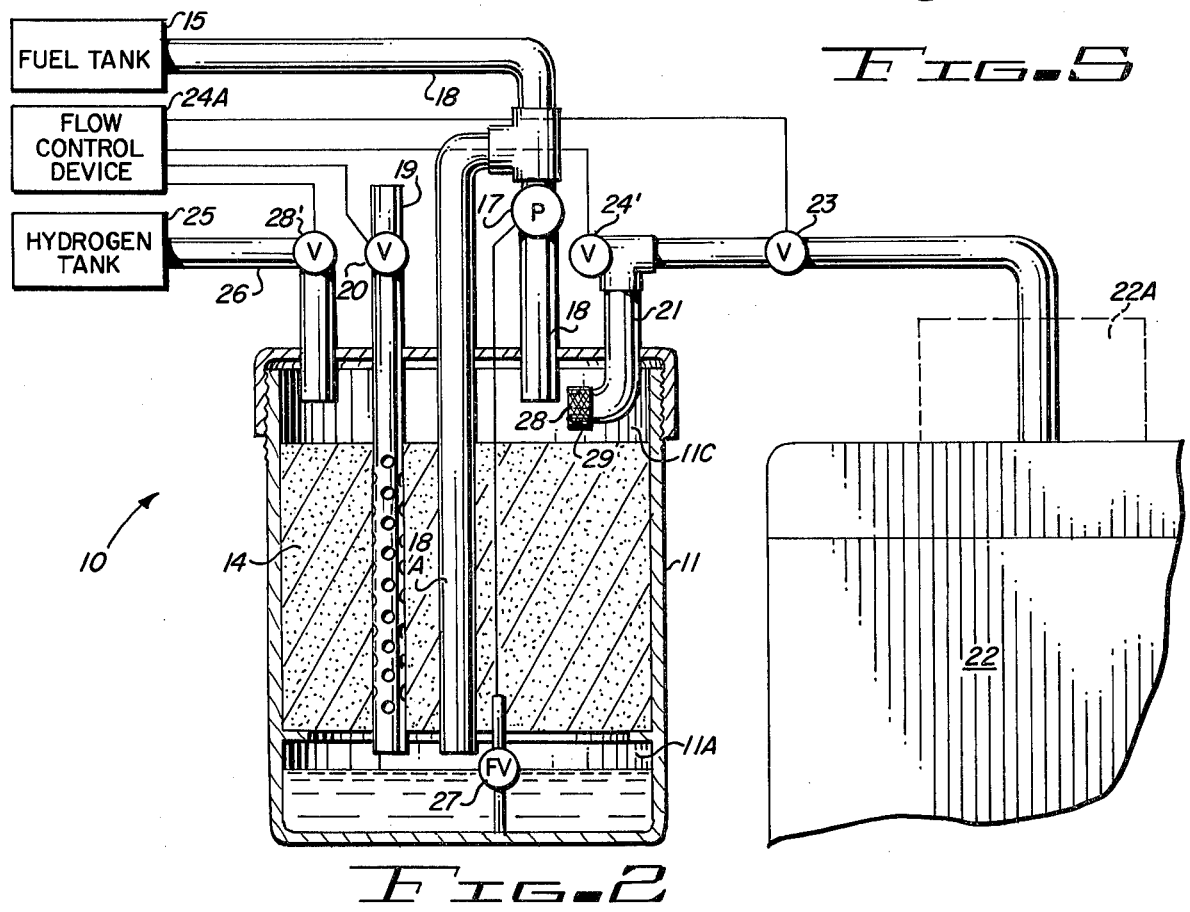

FUEL SYSTEMS FOR INTERNAL COMBUSTION ENGINES

BACKGROUND OF THE INVENTION

The rising cost of gasoline and the growing awareness of the nation's dwindling oil reserves emphasize the urgency for the attainment of improved efficiency in gasoline and other hydrocarbon burning engine performance.

At the same time, there is a widespread determination to end or greatly reduce the level of atmospheric pollution to which the automobile has contributed.

Because the proper performance of the carburetor is essential to the realization of both of these goals, significant improvements in carburetor-type systems are urgently needed.

The conventional carburetor as employed in today's automobile is a complex mechanical device comprising as many as six separate systems, i.e. a float system for controlling the level of fuel in the bowl, a low-speed or idling system, a high-speed or cruising system, an accelerating pump system, and power and choke systems. In addition, there are anti-percolation vents, hot idle compensators, anti-dieseling solenoids, deceleration controls, etc.

This multitude of special systems and features requires careful adjustment and maintenance and the many small ducts and valves are vulnerable to blockage and wear by dust and dirt particles finding their way through the air filter.

Furthermore, until recently, there has been a greater emphasis on certain aspects of performance such as starting, acceleration and power developed with too little emphasis given to gasoline mileage and atmospheric pollution. The sudden change in emphasis toward improved fuel economy and reduced atmospheric pollution calls for a radical new approach to fuel vaporization or gasification system for the internal combustion engines as opposed to the enhancement of today's carburetors by the addition of still more vents, valves and modified ventures.

SUMMARY OF THE INVENTION

In accordance with the invention claimed, an improved fuel generation system is provided for the vaporization, aeration, gasification and humidification of hydrocarbontype fuels prior to their introduction into a consuming engine.

It is, therefore, one object of this invention to provide an improved fuel generating system for hydrocarbon burning engines.

Another object of this invention is to provide such an improved fuel generating system which achieves greater fuel economy by virtue of its capability for supplying a more uniform mixture of air and hydrocarbon fumes.

A further object of this invention is to provide such a fuel generating system which achieves greater fuel economy by virtue of its capability for converting the entrained fuel into more finely divided particles.

A still further object of this invention is to provide such an improved fuel generating system in which the fuel-air mixture is fortified with hydrogen to enhance the fuel economy.

Yet another object of the invention is to provide a cleaner fuel burn with the result that oil changes will be required less frequently than for a conventional system.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a partial perspective view of a fuel generator for a hydrocarbon burning engine and embodying the invention;

FIG. 2 is a functional diagram of an improved fuel generating system utilizing the fuel generator shown in FIG. 1;

FIG. 3 is a cross-sectional view of a modification of the fuel generator shown in FIG. 1;

FIG. 4 is a partial perspective view of the top, left end and front of the fuel generator shown in FIG. 3; and FIG. 5 is a perspective view of the bottom, front and right end of the fuel spray head shown in FIG. 3.

DESCRIPTION OF THE PREFERRED EMBODIMENT

Referring more particularly to the drawing by characters of reference, FIG. 1 discloses an improved fuel generator 10 comprising a vaporization chamber 11 having three interconnected zones, i.e. a liquid zone 11A for containing suitable liquids such as hydrocarbons including, for example, gasoline 12 at the lower end 13 of the chamber, a vaporization zone 11B for said liquid intermediate the ends of chamber 11 containing a porous material 14, and a vapor zone 11C providing a space at the top end 15 of the chamber for collection and mixing of fuel vapors. A suitable hydrocarbon supply such as gasoline is furnished from a gasoline tank 15 shown in FIG. 2 of an automobile or other device which is transmitted by pump 17 through a fuel line or conduit 18 to zone 11C of chamber 11 from which zone it percolates or filters through to zone 11A, leaving the interior of the porous material in zone 11B wet with finely divided droplets of gasoline. An apertured air intake conduit means 19 is provided for supplying atmospheric air into the porous material 14 in zone 11B of chamber 11 through a control valve 20 and into an air space in zone 11A above the gasoline in this zone.

As evident from FIGS. 1 and 2 of the drawing, a fuel line 21 interconnects the air space in zone 11C of chamber 11 directly to an internal combustion engine 22 through a regulator valve 23 or to and through a carburetor 22A to internal engine 22. Line 21 is conformed to provide an opening 24 to atmosphere in the form of a valve means for providing a venturi action for injecting air into the fuel line 21 for further mixing purposes aided by the negative pressure or suction of engine 22 in the drawing of fuel vapors from the vapor space 11C of chamber 11 directly or through a carburetor into the manifold of the internal combustion engine or any other vapor burning device.

In order to supplement or fortify the hydrocarbon fumes or mixture supplied engine 22, such as gasoline, through the fuel line 21, a source of hydrogen 25 under pressure is connected via gas line 26 through control valve 28' to the vapor space 11C of chamber 11. Valve 28' regulates and controls the flow of hydrogen to the vapor space of chamber 11.

The vaporization and fuel generating chamber 11 holds a controlled amount of a hydrocarbon fuel, such as gasoline 12, in zone 11A which may be held at a desired level by means of a suitable float operated valve arrangement 27 associated with line 18 which controls the fuel supplied to zone 11C by fuel pump 17. Further, the return fuel line 18A connected to zone 11A is provided for drawing back into zone 11C through the action of pump 17 the residue of fuel in zone 11A.

The humidifying gasification chamber 11 holds a controlled amount of porous material 14 which is selected for its ability to absorb and disperse hydrocarbon fuels or their vapors throughout its configuration thereby providing a large vaporization surface for the fuel, such as gasoline, in either its liquid or vapor state to provide a continuous supply of hydrocarbon vapors or fumes to the space 11C of chamber 11.

As noted from FIG. 1 of the drawing, chamber 11 comprises an airtight tank having suitable ports for air and fuel intake and an outlet port for conducting the vaporized fuel to engine 22.

Zone 11B of chamber 11 may be filled with a porous resilient material such as foam rubber which absorbs the fuel metered into zone 11A of chamber 11 through fuel line 18. The porous material 14 suspends the fuel passing therethrough in such a manner as to render it more vaporizable. It should be recognized that other means of vaporizing or gasification of the fuel may be used in lieu of the porous material 14 and still fall within the scope of this invention.

The fuel line inlet port 28 in the vaporizing space of zone 11C at the top of chamber 11 may be provided with a diffusing drip ring 29 to aid in maintaining or revaporizing any condensation of the gasoline in fuel line 21. Further, if the disclosed device is used independently of and in lieu of a carburetor, the regulator control valve 23 may be provided in the fuel line to control the fuel flow to engine 22 in the manner of the known accelerator pedal in an automobile.

It has been observed that after a short period of time, such as twenty or thirty minutes of engine running time, the amount of air introduced in fuel line 21 through opening 24 may be reduced since the residue of gasoline remaining in zone 11A of chamber 11 is less volatile than the fresh gasoline furnished chamber 11 from tank 16. This residue in zone 11A may be rendered highly volatile by the introduction into zone 11C of the chamber a controlled amount of hydrogen. The minute amount of hydrogen introduced into chamber 11 not only eliminates the need for reducing the air input into the fuel line 21 through port 24 after a period of engine operation but also mixes with the residue of any hard-to-vaporize residue of gasoline in zone 11A to make it more volatile, thereby improving engine performance. The amount of air injected into fuel line 21 through the venturi action of the valve means 24' associated with opening 24 is controlled by a suitable flow control device 24A. This flow control device 24A may comprise the gas pedal of engine 22 or any other easily operated fuel control regulator. It should be recognized that the amount and control of air introduced through opening 24 is essential to the effective operation of the invention disclosed and claimed herein.

FIGS. 3, 4 and 5 of the drawing illustrate a modification of the fuel generator 10 shown in FIGS. 1 and 2 wherein fuel generator 30 comprises a chamber 31 having a zone 31A containing a porous material 32 and a vapor zone 31B provided at the top end 33 of the chamber. This generator is provided with the same fuel line 18, air intake conduit means 19 and fuel lines 21 and 26 of FIGS. 1 and 2.

It should be noted that the fuel generator 30 differs from fuel generator 10 of FIGS. 1 and 2 in that it merely comprises a two-zone generator having an apertured spray head 34 fastened to the end of fuel line 18 in space 31B directly over the porous material 32 in zone 31A. Thus, the fuel introduced into the fuel generator is dispersed evenly across the top of the porous material for percolating through the porous material, and may be used in the structure of FIGS. 1 and 2 to accomplish the same results.

Although but two embodiments of the invention have been illustrated and described, it will be apparent to those skilled in the art that various changes and modifications may be made without departing from the spirit of the invention or the scope of the appended claims.

What is claimed is:

1. A fuel system for liquid hydrocarbon burning engines comprising in combination:

a chamber having fluid inlet and outlet ports and defining a vaporization zone and a vapor collecting and mixing zone, means for connecting a source of liquid hydrocarbon fuel under pressure through said fluid inlet port to said vaporization zone, an air intake manifold connected to said vaporization zone of said chamber, said intake manifold providing a means for dispersing air throughout said vaporization zone for aiding in the vaporizing of the fuel dispersed throughout the vaporization zone, a first conduit means leading from said outlet port of said chamber arranged in said collecting and vapor mixing zone to either a hydrocarbon burning engine or carburetor therefore, said first conduit means being provided with an air intake port for injecting air into said first conduit means under negative pressure of the engine used with said fuel system, a second conduit means leading from a source of hydrogen to said collecting and mixing zone, valve means for selectively controlling the flow of hydrogen through said second conduit means into said collecting and mixing zone, and porous material positioned within said vaporization zone for dispersing said fuel in the form of finely divided droplets, said air from said air intake manifold vaporizing the droplets into fumes throughout said vaporization zone.

2. The fuel system set forth in claim 1 wherein: said porous material comprises a resilient material.

3. The fuel system set forth in claim 1 wherein: said porous material comprises foam rubber.

4. The fuel system for hydrocarbon burning engines set forth in claim 1 wherein:

said chamber also having means defining a liquid zone.

5. The fuel system set forth in claim 4 in further combination with:

a valve means in said first conduit means for controlling the flow of vaporized fuel from said collection and mixing zone to the engine.

6. The fuel system set forth in claim 1 wherein:

said first conduit means further comprises a valve means for performing a venturi action for aiding in drawing air from said vaporization zone.

7. A method for vaporizing liquid hydrocarbon fuel comprising the steps of:
- pumping the liquid fuel in a controlled manner into a first zone containing a porous material in a vertically positioned vapor generating chamber to form finely divided droplets of fuel in said porous material
- vaporizing the droplets by forcing air under pressure throughout said porous material
- collecting said vaporized fuel in a second zone in said chamber immediately above said first zone,
- selectively blending hydrogen with the vaporized fuel in said second zone, and
- transmitting in a controlled manner the vaporized fuel and hydrogen vapors to a vapor burning engine.

8. The method set forth in claim 7 wherein:
said porous material comprises foam rubber.

9. The method set forth in claim 7 in further combination with the step of:
- introducing air into said vaporized fuel or vaporized fuel and hydrogen vapors during transmittal to said engine.

10. The method set forth in claim 9 wherein:
the step of introduction of air during transmittal to said engine is by venturi action.

* * * * *